United States Patent
Magret et al.

(10) Patent No.: US 7,630,299 B2
(45) Date of Patent: Dec. 8, 2009

(54) RETENTION OF A STACK ADDRESS DURING PRIMARY MASTER FAILOVER

(75) Inventors: Vincent Magret, Oak Park, CA (US);
Laurence Rose, Oak Park, CA (US)

(73) Assignee: Alcatel Lucent, Paris (FR)

( * ) Notice: Subject to any disclaimer, the term of this patent is extended or adjusted under 35 U.S.C. 154(b) by 674 days.

(21) Appl. No.: 11/028,346

(22) Filed: Dec. 30, 2004

(65) Prior Publication Data

US 2006/0146697 A1 Jul. 6, 2006

(51) Int. Cl.
*H04J 1/16* (2006.01)

(52) U.S. Cl. .................. 370/219; 370/220; 370/243; 370/255

(58) Field of Classification Search .......... 370/219, 370/220, 218, 223, 243, 255
See application file for complete search history.

(56) References Cited

U.S. PATENT DOCUMENTS

| | | | | |
|---|---|---|---|---|
| 6,496,502 B1 * | 12/2002 | Fite et al. | .................. | 370/389 |
| 6,785,272 B1 * | 8/2004 | Sugihara | .................. | 370/386 |
| 6,801,950 B1 * | 10/2004 | O'Keeffe et al. | ............ | 370/389 |
| 6,934,292 B1 * | 8/2005 | Ammitzboell | ............... | 370/400 |
| 7,120,683 B2 * | 10/2006 | Huang | ........................ | 709/223 |
| 7,123,615 B2 * | 10/2006 | Weyman et al. | ............. | 370/389 |
| 7,167,441 B2 * | 1/2007 | Donoghue et al. | .......... | 370/216 |
| 7,274,703 B2 * | 9/2007 | Weyman et al. | ............. | 370/401 |
| 7,289,496 B2 * | 10/2007 | Donoghue et al. | .......... | 370/386 |
| 7,305,458 B2 * | 12/2007 | Hsue et al. | .................. | 709/220 |
| 7,469,279 B1 * | 12/2008 | Stamler et al. | .............. | 709/221 |
| 2005/0198373 A1 * | 9/2005 | Saunderson et al. | ......... | 709/238 |

* cited by examiner

*Primary Examiner*—Ricky Ngo
*Assistant Examiner*—Dewanda Samuel
(74) *Attorney, Agent, or Firm*—Galasso & Associates

(57) ABSTRACT

The present invention features embodiments of alleviating the impact to a system of stack switches, as well as to neighboring nodes communicating with such a system, when a primary master switch to secondary master switch failover occurs. The features of the present invention, generally enables a system of stack switches to retain, for a fixed or indefinite period of time, its stack address even when multiple primary master to secondary master failovers occur. This way recalculation of certain protocols—e.g., spanning trees and link aggregations—and updating of certain tables—e.g., address resolution protocol (ARP) and routing tables—are minimized.

15 Claims, 12 Drawing Sheets

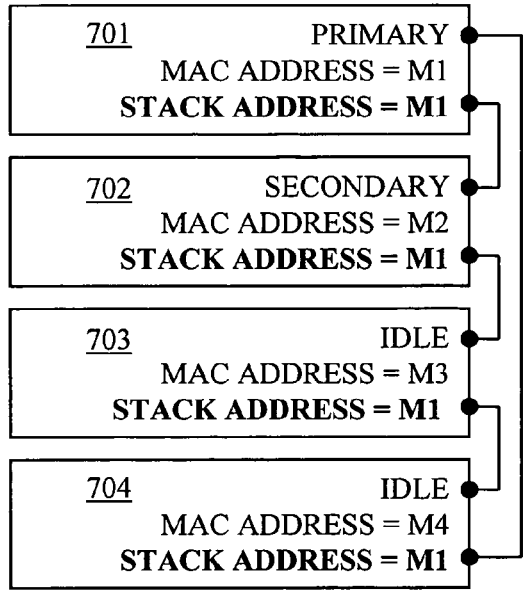

DEFINITE RESTART TIME SPECIFIED, e.g., 60 secs. 700

*BEFORE FAILOVER*

| 701 | PRIMARY |
| MAC ADDRESS = M1 |
| STACK ADDRESS = M1 |

| 702 | SECONDARY |
| MAC ADDRESS = M2 |
| STACK ADDRESS = M1 |

| 703 | IDLE |
| MAC ADDRESS = M3 |
| STACK ADDRESS = M1 |

| 704 | IDLE |
| MAC ADDRESS = M4 |
| STACK ADDRESS = M1 |

FIG. 7A

*AFTER FAILOVER* 700

| 701 | OFFLINE |
| MAC ADDRESS = M1 |

| 702 | PRIMARY |
| MAC ADDRESS = M2 |
| STACK ADDRESS = M1 |

| 703 | SECONDARY |
| MAC ADDRESS = M3 |
| STACK ADDRESS = M1 |

| 704 | IDLE |
| MAC ADDRESS = M4 |
| STACK ADDRESS = M1 |

FIG. 7B

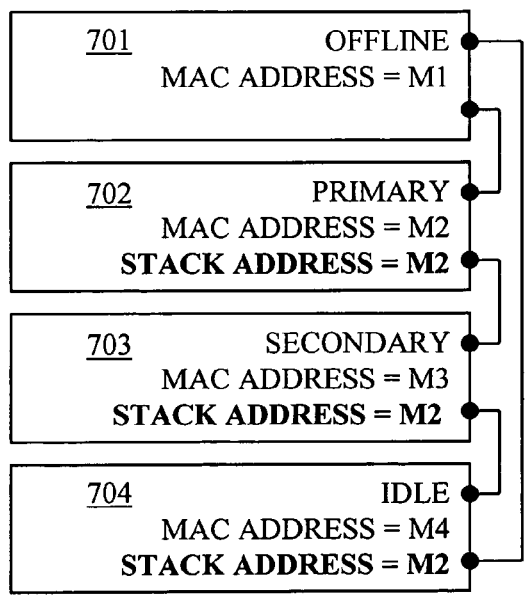

*AFTER RESTART TIME, NO REJOIN, WITH UNMASK* 700

| 701 | OFFLINE |
| MAC ADDRESS = M1 |

| 702 | PRIMARY |
| MAC ADDRESS = M2 |
| STACK ADDRESS = M2 |

| 703 | SECONDARY |
| MAC ADDRESS = M3 |
| STACK ADDRESS = M2 |

| 704 | IDLE |
| MAC ADDRESS = M4 |
| STACK ADDRESS = M2 |

FIG. 7C

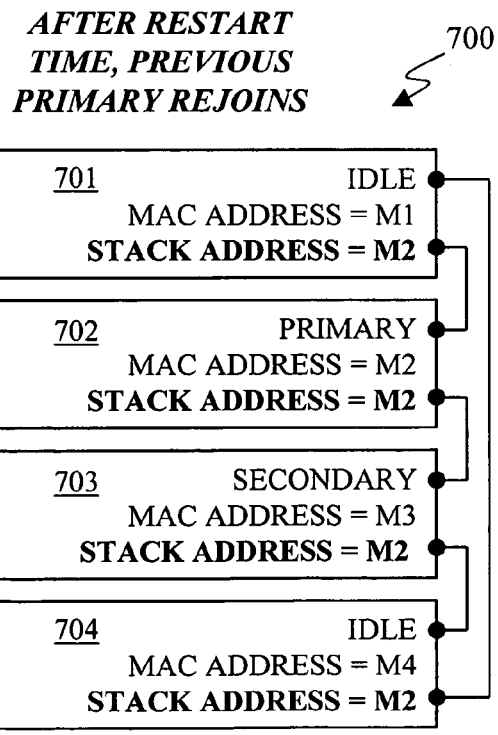

*AFTER RESTART TIME, PREVIOUS PRIMARY REJOINS* 700

| 701 | IDLE |
| MAC ADDRESS = M1 |
| STACK ADDRESS = M2 |

| 702 | PRIMARY |
| MAC ADDRESS = M2 |
| STACK ADDRESS = M2 |

| 703 | SECONDARY |
| MAC ADDRESS = M3 |
| STACK ADDRESS = M2 |

| 704 | IDLE |
| MAC ADDRESS = M4 |
| STACK ADDRESS = M2 |

FIG. 7D

DEFINITE RESTART TIME SPECIFIED, e.g. 20 min.
*BEFORE FAILOVER*

*AFTER FAILOVER*

*AFTER REJOIN OF PREVIOUS PRIMARY WITHIN RESTART TIME*

RETENTION OF A STACK ADDRESS DURING PRIMARY MASTER FAILOVER

TECHNICAL FIELD

The invention generally relates to the management of a system of stack switches in a data communication network. In particular, the invention relates to a system of fault-tolerant stack switches adapted to detect, cope with, and recover from switch failures, without necessarily changing the stack media access control (MAC) address of the system of stack switches.

BACKGROUND

Stackable switches are switches or routers that may function in a stand-alone mode and may also function within a stack. These stackable switches, herein referred to as switches, are coupled into a single logical unit called a stack. The switches are operatively interconnected via a pair of designated stack ports present on each switch. The system of stack switches is generally coupled in series and the topology of the system generally characterized by a closed loop called a ring or an open strand of switches referred to herein as a chain. Each of the stack switches is adapted to perform switching between its own data ports as well as the data ports of other stack switches by transmitting packets via the stack ports, that facilitate the efficient transmission and switching of these packets to the appropriate stack switch port.

Each switch in a stack may be elected to become the primary master or the secondary master. The primary master performs the primary stack management functions, which may include maintaining and updating configuration file, routing information, and other stack information. The secondary master acts as a back-up to the primary master. One primary master switch and one secondary master switch are generally elected in a stack system. This election mechanism may be governed by various election criteria as known to those of ordinary skill in the art. Such election criteria, for example, are governed by the switch having the lowest media access control (MAC) address or having the longest uptime or having the lowest stack identifier. User priority may also govern the primary and secondary master election.

Various pieces of information are needed to effectively run and communicate with a system of integrated stack switches. The system of stack switches is generally, for example, identified with one Internet Protocol (IP) address and one stack address. This makes the system of stack switches appear as one logical unit, particularly, to external devices communicating with such system.

Each switch element is delivered to a customer with a unique local MAC address. This address is a globally-assigned organizationally-unique identifier that is assigned by the manufacturer. This MAC address is generally stored in persistent memory. In traditional or prior art system of stack switches, the stack address mirrors the MAC address of the currently running primary master. Thus, when a primary master fails and a secondary master starts functioning as the primary master, the stack address for the system of stack switches is also accordingly changed to reflect the MAC address of the now running primary master.

This constant change whenever a failover occurs impacts not only the system of stack switches but also surrounding devices that communicate with this stack. One example is the impact to address resolution protocol (ARP) tables and other Layer 3 tables. For example, let us assume that the system of stackable switches, Stack A, is known to surrounding devices with stack address, M1. When a failover occurs, the secondary starts functioning as the new primary master and the stack address is also accordingly changed, for example, to M2, i.e., the new primary master's MAC address. Stack A advertises its new stack address—M2. Neighboring or surrounding nodes which have already associated Stack A with stack address M1, now have to changed their ARP tables to associate Stack A with the new stack address M2. This change in stack address also entails updating and replacing all routes using the previous stack address of M1, as the next hop, with the new stack address M2.

Another aspect that may be impacted is link aggregation, in accordance with the IEEE 802.3ad Link Aggregation Standard. Link aggregation or trunking is a method of combining physical network links into a single logical link to increase bandwidth. In some prior art embodiments, changing the stack address results in the aggregates or trunks being recomputed considering that the stack address is used in computing keys necessary to provide link aggregation. A change in the stack address thus generates a new set of keys using the new address.

Another aspect that may be impacted is the recalculation of the spanning tree in accordance with the spanning tree protocol. This protocol is contained in the IEEE 802.1D standard. If the stack address is changed due to the election of a new primary master, a new spanning tree has to be recalculated to account for this change. This is particularly burdensome, when the new elected primary master becomes the new root bridge. The root bridge uses the MAC address as one of its parameters.

The change in the stack address does have a direct impact to the network and to the performance of the system of stack switches. The change of stack address gives rise to higher latency due to relearning of the new stack address or recomputation of new spanning tree or trunks. This also gives rise to situations where links are temporarily down. This impact is also particularly burdensome when multiple primary master to secondary master failovers occur. A way to alleviate this negative impact is thus highly desirable. The present invention fulfills this need.

SUMMARY

The present invention features embodiments of alleviating the impact to a system of stack switches, as well as to neighboring nodes communicating with such a system, when a primary master switch to secondary master switch failover occurs. The features of the present invention, generally enables a system of stack switches to retain, for a fixed or indefinite period of time, its stack address even when multiple primary master to secondary master failovers occur. This way recalculation of certain protocols—e.g., spanning trees and link aggregations—and updating of certain tables—e.g., address resolution protocol (ARP) and routing tables—are minimized.

In the first embodiment, the present invention provides for a switching device in a stack system comprising a plurality of stack switches operably coupled in a series and each of the plurality of stack switches having its own local address. The switching device comprises two stack ports, at least one of the stack ports operably coupled to one of the plurality of stack switch; and a stack manager. The stack manager is adapted to: elect a primary master switch to perform the primary stack management functions of the stack switch system; assign a stack address to the plurality of stack switches based on the local address of the primary master switch; elect a secondary master ready to function as a new primary master switch when the primary master switch fails; receive a restart time wherein the restart time is a definite fixed period restart time or an indefinite period of time; and determine whether the stack address is to be replaced when the secondary master switch functions as the new primary master switch. In another embodiment, the stack manager is further adapted to replace the stack address with a new stack address based on the local address of the secondary master functioning as the new primary master switch, when the primary master fails and the primary master is unable to join the stack switch system within the definite fixed period restart time.

In another embodiment, the present invention provides for a method of managing a system of stack switches comprising a plurality of stack switches, one of the plurality of stack switches elected as a first primary master switch, one of the plurality of stack switches elected as a first secondary master switch, and the system of stack switches assigned a stack address. This method comprises the steps receiving a restart time indicating a definite fixed period of time or an indefinite period of time; replacing the first primary master switch with the first secondary master switch to function as the second primary master, when the first primary master switch fails; replacing the stack address with a new stack address based on the local address of the secondary primary master only when the restart time is a definite fixed period and the first primary master is unable to join the system of stack switches within the restart time that is definite fixed period fixed, or when a command is received to replace the stack address with a new stack address.

In another embodiment, the invention provides for a switching device. This switching device may be coupled to a stack switch system comprising a plurality of stack switches operably coupled, one of the plurality of stack switches elected as a primary master to perform primary stack management functions, and another one of the plurality of stack switches elected as a secondary master to function as a new primary master when the primary master fails. The stack system is assigned a first stack address. This switching device comprises two stack ports, at least one of the stack ports adapted to operably couple with one of the plurality of stack switches; and a stack manager adapted to perform, by the secondary master functioning as the new primary master, the primary stack management functions using the first stack address and without using a local address of the new primary master.

BRIEF DESCRIPTION OF THE DRAWINGS

The present invention is illustrated by way of example and not limitation in the figures of the accompanying drawings, and in which:

FIGS. 7A, 7B, 7C, and 7D illustrate an exemplary four-element ISS system, with a predefined definite restart time, before and after the failover to the second master, and after the expiration of the restart time, in accordance with an embodiment of the present invention;

DETAILED DESCRIPTION OF THE PREFERRED EMBODIMENT

Figure 1:
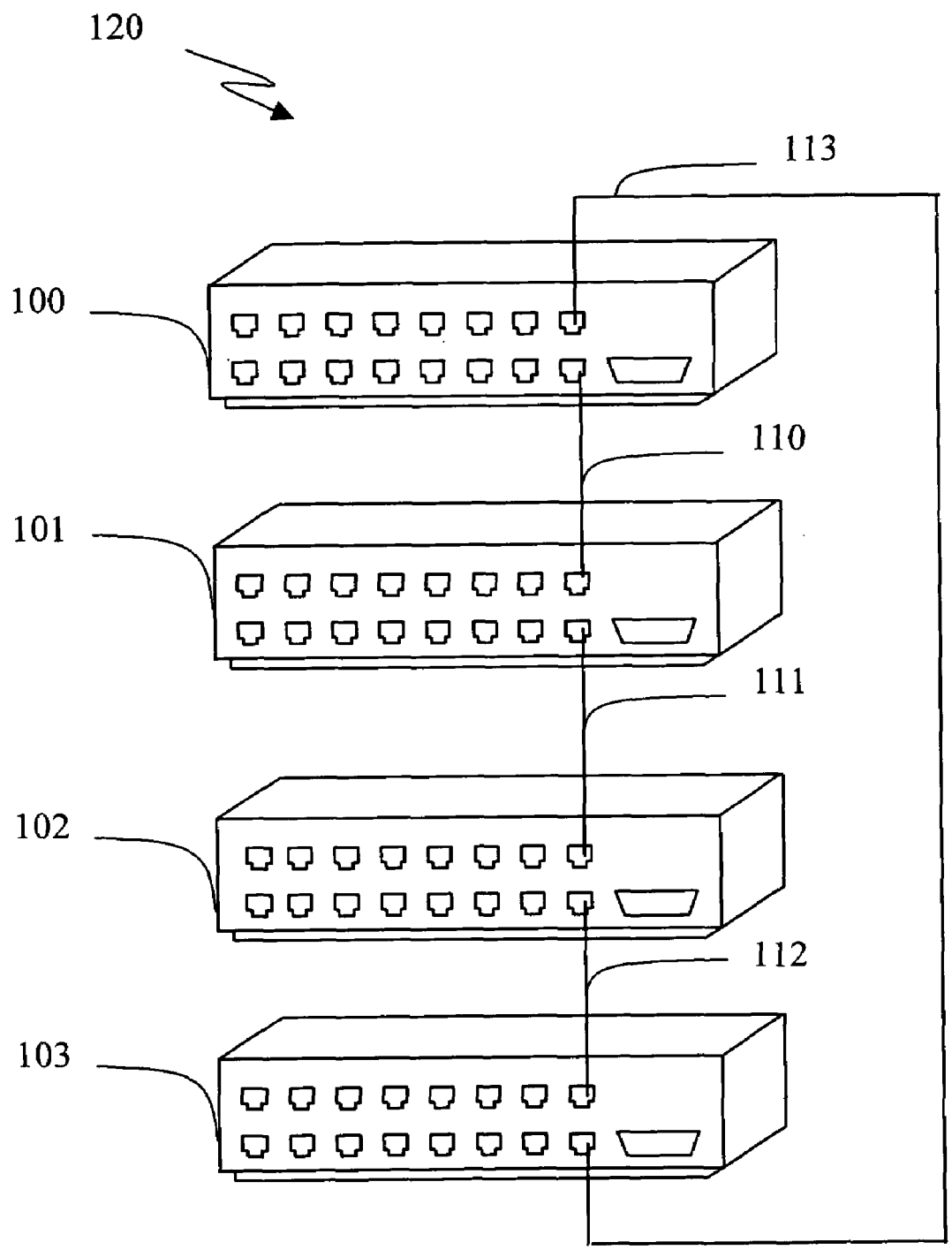
FIG. 1 is a functional block diagram of a system of integrated stack switches (ISS), in accordance with the preferred embodiment of the present invention.

The following detailed description illustrates the invention, by way of example not by way of limitation of the principles of the invention in a fashion that clearly enables one skilled in the art to make and use the invention, and describes several embodiments, adaptations, variations, alternatives and uses of the invention, including what is presently believed to be the best mode of carrying out the invention.

To better understand the figures, like-numbered reference numerals in various figures and descriptions are used in the following description to refer to the same or similar structures, actions, operations, or process steps. In addition, reference numerals within the one hundred series, for example, 102 and 104, are initially introduced in FIG. 1, reference numerals in the two hundred series, for example, 222 and 224, are initially introduced in FIG. 2, and so on and so forth. So, reference numerals in the nine hundred series, e.g., 920 and 940, are initially introduced in FIG. 9.

Illustrated in FIG. 1 is a functional block diagram of a system of integrated stack switches (ISS) in a data communications network. The ISS 120 includes a plurality of stack switches 100-103 operatively linked in a series to form a chain or a ring topology, for example, by means of stack links 110-113, e.g., twisted-pair or fiber optic cables. The switching devices 100-103 are preferably stackable switches operatively coupled to one another through one or more specialpurpose ports referred to by those skilled in the art as stack ports. The plurality of stack switches 100-103, also referred to as stack elements and elements herein, are adapted to transmit packetized data between the other switches of the ISS 120 as well as one or more end stations and other addressable entities operatively coupled to the ISS via one or more local area networks (LANs), wide area networks (WANs), metropolitan area networks (MANs), or the Internet, for example.

In the preferred embodiment, the stack switches 100-103 are multi-layer switches adapted to perform switching and routing operations with protocol data units (PDUs), preferably frames and packets, at Layer 2 (Data Link Layer) and Layer 3 (Network Layer) as defined by the Open Systems Interconnect (OSI) reference model, although they may also perform Layers 4-7 switching operations. Each of the stack switches 100-103 is generally capable of functioning as a stand-alone network bridge, switch, or router. Together, the stack switches 100-103 cooperate to emulate a single switching device. The ISS system 120 preferably has a single stack address used by all the switch elements and a single Internet Protocol (IP) address.

With a stack manager of the preferred embodiment, the ISS 120 of the present invention, minimizes and controls the updates of tables, particularly Layers 2-3 tables, of end stations or other addressable entities operatively coupled to the ISS 120 via a network. The ISS of the present invention also minimizes and controls the computational updates needed by certain protocols, such as link aggregation and spanning tree protocol when a switch management failover occurs.

Figure 2:
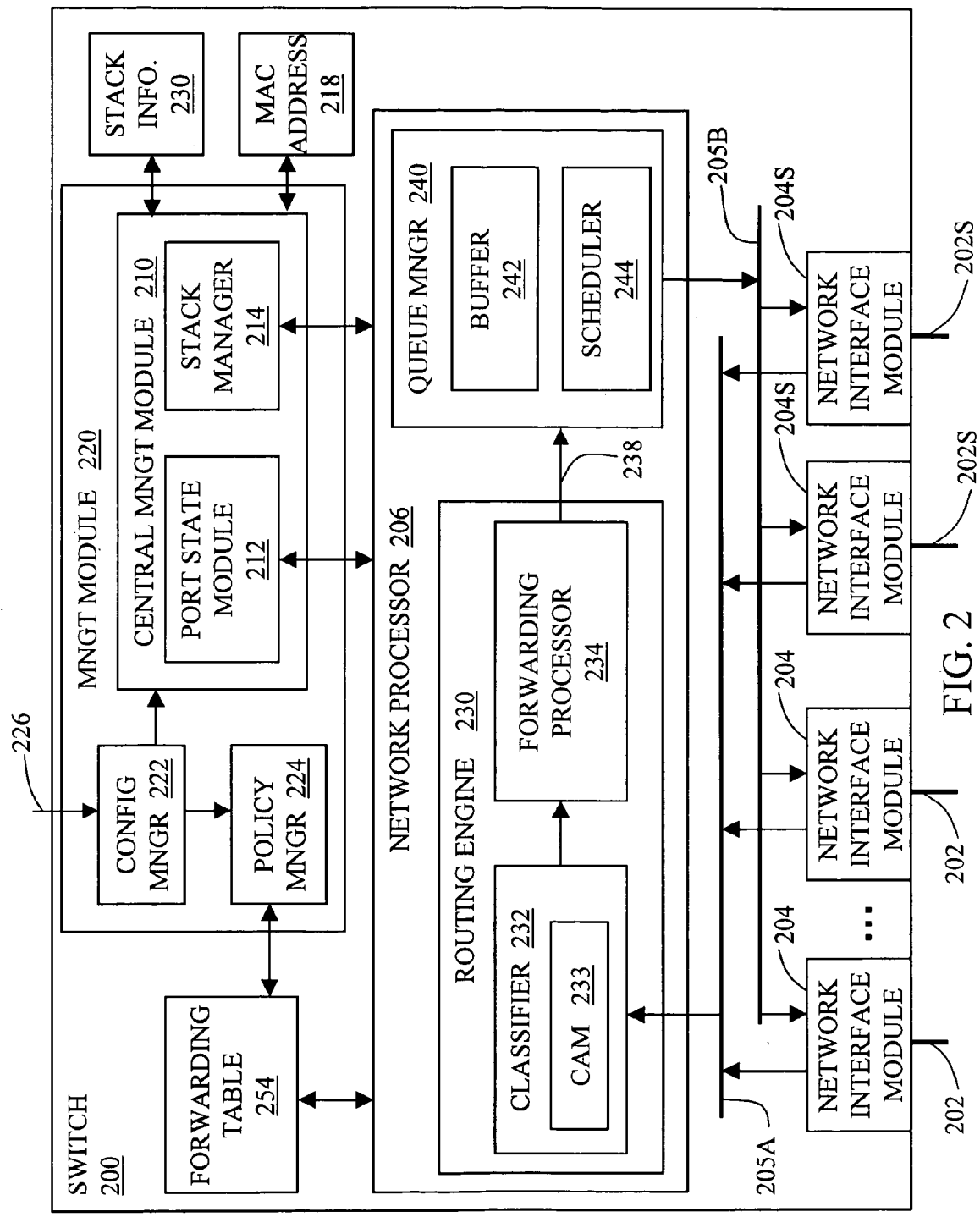
FIG. 2 is a functional block diagram of a stack switch employed in the ISS system, in accordance with the preferred embodiment of the present invention.

Illustrated in FIG. 2 is a functional block diagram of a stack switch employed in the ISS 120 system of the preferred embodiment. The stack switch 200 comprises one or more network interface modules (NIMs) 204, one or more switching controllers 206, a management module 220 which cooperate to receive ingress data traffic and transmit egress data traffic via each of the external ports 202. For purposes of this embodiment, data flowing into the switch 200 from another network node is referred to herein as ingress data, which comprises ingress protocol data units. In contrast, data propagating internally to a port 202 for transmission to another network node is referred to as egress data, which comprises egress PDUs. Each of the plurality of the ports 202 is preferably a duplex port adapted to receive ingress data and transmit egress data.

The NIMs 204, 204S preferably include one or more physical layer interfaces and data link layer interfaces adapted to exchange PDUs, e.g., Ethernet frames and IP packets, via network communications links (not shown). Among the plurality of ports 202 are two stack ports 202S for incorporating the particular stack switch 200 into the ISS 120. The stack port NIMs 204S associated with the two stack ports 202S are, for example, standard Ethernet ports and are adapted to exchange PDUs conventional data traffic with various compatible nodes as well as inter-stack communications to other stack switches depending on the stack configuration mode. The ingress PDUs are conveyed from the plurality of NIMs 204, 204S to the switching controller 206 by means of one or more ingress data buses 205A. Similarly, the egress PDUs are transmitted from the switching controller 206 to the plurality of NIMs 204 via one or more egress data buses 205B.

The management module 220 generally comprises a policy manager 224 for retaining and implementing traffic policies. The policies implemented by the policy manager 224 are preferably based in part on Layer 2 and or Layer 3 addressing information derived from source learning operations, route information received from other routing devices, and filtering rules uploaded by the network administrator via a configuration manager 222 using, for example, simple network management protocol (SNMP) messages 226. The traffic policies derived from source learning, other network nodes, and the administrator are made available to the routing engine 230 and collectively represented by the forwarding table 254.

The configuration manager 222 preferably is also able to receive configuration information uploaded by the network administrator. This configuration information includes restart time information, which is used to determine whether the stack address of the ISS 120 is to be replaced with a new stack address. This information may be stored in a stack information module 230, which may also contain routing and switching tables for managing the ISS. This stack information module 230 enables the various switch elements to communicate and work with each other within the stack environment.

In addition to the traffic policies, the management module 220 further includes a central management module (CMM) 210 for implementing the ISS stack switching functions discussed in more detail below. The CMM 210 of the preferred embodiment comprises a port state module 212 and a stack manager 214. The port state module 212 is adapted to monitor the operational state of the stack ports 202S using keep-alive signals, for example, and identify the presence of adjacent stack switches coupled to the stack ports 202S.

The stack manager 214 in the preferred embodiment is adapted to participate in the elections that determine the management responsibilities of each stack switch, process supervision messages used to monitor the status of the other switches, and if, necessary, serve as a primary master switch (PMS) or a secondary master switch (SMS) whose responsibilities may include assigning and propagating a stack address to one or more stack switches 100-103, and updating switching and other tables used in the switching operations of the ISS. In addition, the stack manager 214 is adapted to determine the ISS stack switch topology and process topology related messages exchanged between stack switches of the ISS 120. In particular, the stack manager 214 transmits ISS topology requests, transmits known ISS topology information to other stack switches, and maintain one or more local topology tables. In one embodiment, the stack manager 214 is also responsible for detecting the loss of an element, insertion of an additional element (causing a trap to be generated), removal of an element from the stack, determining the operational state of the associated CMM 210. The stack manager 214 is also adapted to read its own local media access control (MAC) address 218—generally assigned by the manufacture—and to receive the local MAC address of the other switch elements within the ISS. The MAC address is preferably stored in a read-only memory chip.

The switch 100 preferably comprises at least one network processor 206 capable of, but not limited to, Layer 2 (Data Link) and Layer 3 (Network) switching operations as defined in the Open Systems Interconnect (OSI) reference model. The set of possible Layer 2 protocols for operably coupling the external ports 202 to a wired and/or wireless communications link include the Institute of Electrical and Electronics Engineers (IEEE) 802.3 and IEEE 802.11 standards, while the set of possible Layer 3 protocols includes Internet Protocol (IP) version 4 defined in Internet Engineering Task Force (IETF) Request for Comment (RFC) 791 and IP version 6 defined in IETF RFC 1883.

The switching controller 206 preferably comprises a routing engine 230 and a queue manager 240. The routing engine 230 comprises a classifier 232 that receives ingress PDUs from the data bus 205A, inspects one or more fields of the PDUs, classifies the PDUs into one of a plurality of flows using a content addressable memory 233, and retrieves forwarding information from the forwarding table 254 retained in high-speed memory. The forwarding information retrieved from the forwarding table 254 preferably includes, but is not limited to, a flow identifier used to specify those forwarding operations necessary to prepare the particular PDU for egress, which may include the next-hop address and class of service (COS) or Quality of Service (QOS) provisions.

The forwarding processor 234 receives the ingress PDUs with the associated forwarding information and executes one or more forwarding operations prior to transmission to the appropriate egress port or ports. The forwarding operations preferably include but are not limited to header transformation for re-encapsulating data, VLAN tag pushing for appending one or more VLAN tags to a PDU, VLAN tag popping for removing one or more VLAN tags from a PDU, quality of service (QoS) for reserving network resources, billing and accounting for monitoring customer traffic, Multi-Protocol Label Switching (MPLS) management, authentication for selectively filtering PDUs, access control, higher-layer learning including Address Resolution Protocol (ARP) control, port mirroring for reproducing and redirecting PDUs for traffic analysis, source learning, class of service (CoS) for determining the relative priority with which PDUs are allocated switch resources, color marking used for policing and traffic shaping, and inter-stack switch labeling management used to efficiently distribute PDUs between switches 100-103 of the ISS 120, for example.

After the forwarding processor 234, the PDUs are passed to and stored in the queue manager 240 until bandwidth is available to transmit the PDUs to the appropriate egress port. In particular, the egress PDUs are buffered in one or more of a plurality of priority queues in the buffer 242 until they are transmitted by the scheduler 244 to an external port 202 via the output data bus 205B.

The switch 200 of the present invention also includes a MAC address 218. This MAC address 218 is preferably a memory chip containing the unique MAC address associated with the switch 200.

Figure 3:
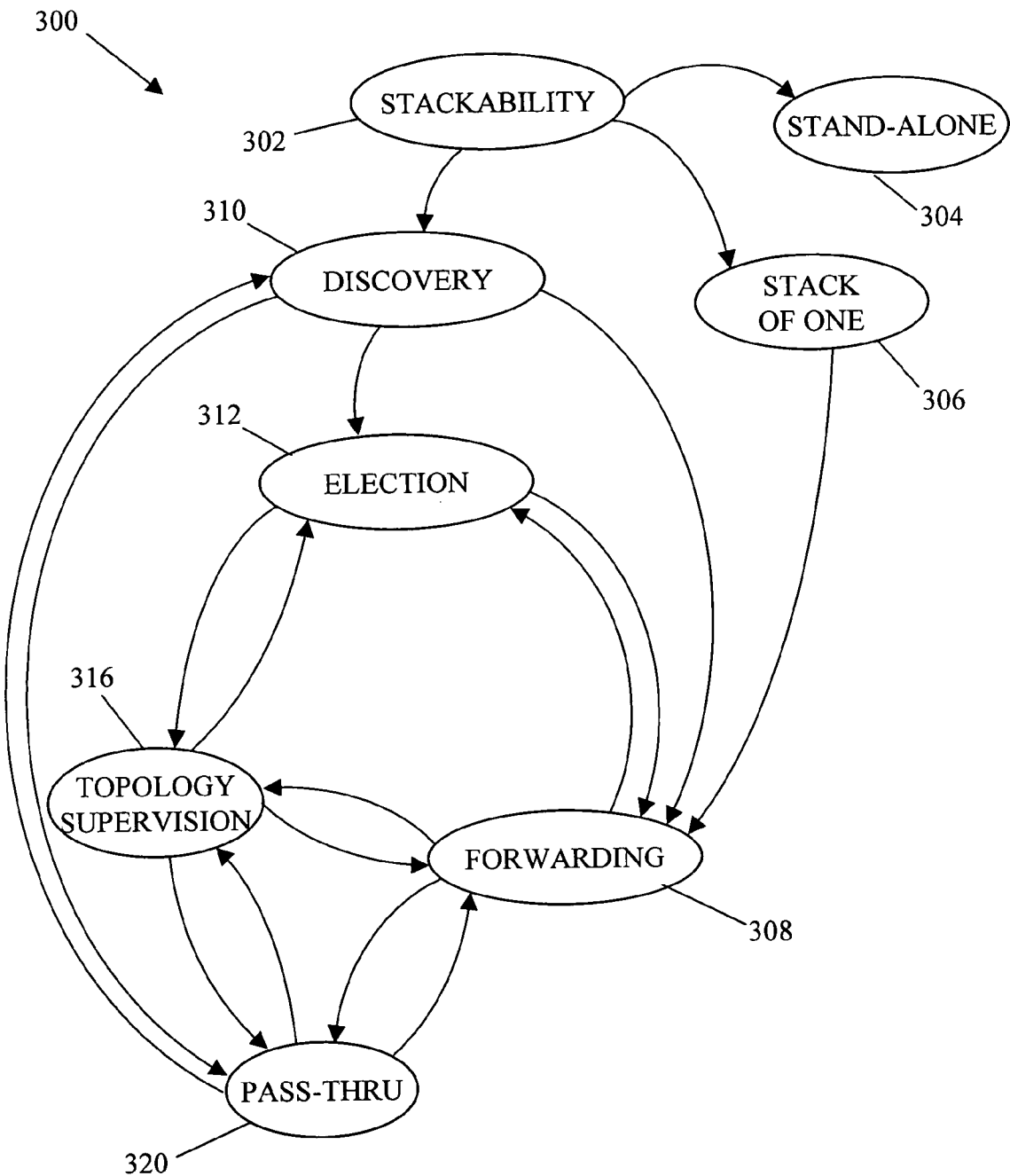
FIG. 3 is a state diagram representing the stages of a stack switch during start up, in accordance with the preferred embodiment of the present invention.

Illustrated in FIG. 3 is a state diagram representing the stages of an automatic setup mechanism employed by a stack switch of the ISS from boot-up to the fully operational modes, in accordance with a preferred embodiment of the invention. Upon initialization, a stack switch 200 enters a stackability determination state 302 in which the switch determines whether it is configured to serve as a stand-alone switch or a stack switch. The stackability is determined based on the physical and operational presence of stack ports 202S. In some embodiment of the invention, it is possible that no stack port is present in a switch. If the switch is configured to serve as a stand-alone operation 304, the stack manager 214 is disabled and the switch operates in accordance with a multi-layer switch having all data ports 202.

When configured as a stack switch, however, the port state module 212 monitors the stack links and indicates to the stack manager 214 changes of any of the two stack links. The stack manager responds, for example, to link up, e.g., a link has been inserted, or link down, e.g., a link has been removed, and accordingly performs the appropriate actions, such as to handle and process the situation wherein one or multiple elements have joined the stack, or one or multiple elements have left the stack. The stack manager 214 listens on the stack ports for keep-alive messages or other signal indicating the presence of adjacent elements. In the absence of an adjacent stack switch, the switch determines that it is a stack of one 306 and proceeds to the forwarding state 308 in which it receives and transmits data traffic on the standards data ports 202 while monitoring the stack ports 202S for the introduction of one or more additional stack elements.

If one or more switches are detected on the stack ports 202S while in the stackability determination state 302, the switch 200 proceeds to the discovery state 310 for purposes of determining the topology of the ISS 120. The stack switch 200 may then proceed to the election state 312 in which the stack switches of the ISS 120 execute a role determination process used to identify which of the elements are to serve as the primary master switch (PMS) and secondary master switch, also referred to herein as the primary master and secondary master, respectively.

The determination criteria of which of the stack elements will serve as the primary and the secondary are known to those of ordinary skill in the art. Examples of such election criteria include, but are not limited to, electing the switch element with the lowest MAC address 218 as the primary master, electing the switch element with the longest running time or uptime as the primary master, electing the primary master and the secondary master based on the slot number assigned, and electing the primary master and the secondary master based on user preference stored in a configuration file.

The primary master is responsible for ISS management functions including handling of all command line interface input and synchronizing images-i.e., synchronizing different software versions on the stack switches. This function may also include synchronizing various tables and information, e.g., switching tables, routing tables, and configuration information. The secondary master is the designated successor to the primary master and functions as the new primary master if the primary master fails or otherwise becomes non-operational. While each of the stack switches of the preferred embodiment may assume the role of the primary and secondary masters, the remaining stack switches defer to the master switches until any one of them is later elected to serve as a master.

While operating in the forwarding state 308, the switch 200 is adapted to transition into and back from the supervision state 316 and the pass-through (PT) state 320. In the supervision state 316, the element 200 transmits supervision messages to both its adjacent neighbors for supervisory purposes, analogous to a keep-alive mechanism for exchanging keep-alive messages When a new stack switch is inserted into the ISS 120 or an existing switch is removed, for example, the switch 200 automatically exchanges topology information with other stack switches and updates its stack switch neighbor tables. If both the primary and secondary masters fail at the same time, the rest of stack switches—which most likely in the forwarding state 308—proceed to election state 312 to elect a new primary master. If the secondary master fails, there is no election, but the primary master chooses one of the idle elements to take the secondary role. Once this element is chosen, the primary master advertises the new assignment to the entire stack with an election indication message that is vested with maximum authority. If the primary master fails, there is no real election, but the secondary master promotes itself to become the new primary master and chooses one of the idle elements to become the new secondary master. Once this element is chosen, the new primary master advertises the new assignment to the entire stack with an election indication message that is vested with maximum authority.

In the preferred embodiment, there is a pass-through state 320. In the pass-through (PT) state 320, the data ports 102 of the stack switch are entirely disabled and routing engine 230 configured to pass data traffic from each of its two stack ports 202S to the opposite stack port. In the PT state 320, the routing engine 320 effectively emulates a fixed wire connection between the stack ports of the two adjacent stack switches, thus preventing what would otherwise be a break in the continuity of the system of stack switches 120. The pass-through may be used to maintain continuity between the stack switches adjacent to a common element instead of shutting down, thereby maintaining the ISS 120 where prior art stack switch systems would have had their ring topology severed or two independent chains created. Switch elements that do not serve any primary or secondary management functions and are not pass-through switches are herein called idle switches.

As illustrated, a stack switch may transition in either direction between the discovery state 310 and the supervision state 316 since supervision is required and is enforced as early as discovery state 310 when a stack switch detects a neighbor and it should, therefore, execute supervisory tasks described in more detail below.

Figure 4A:
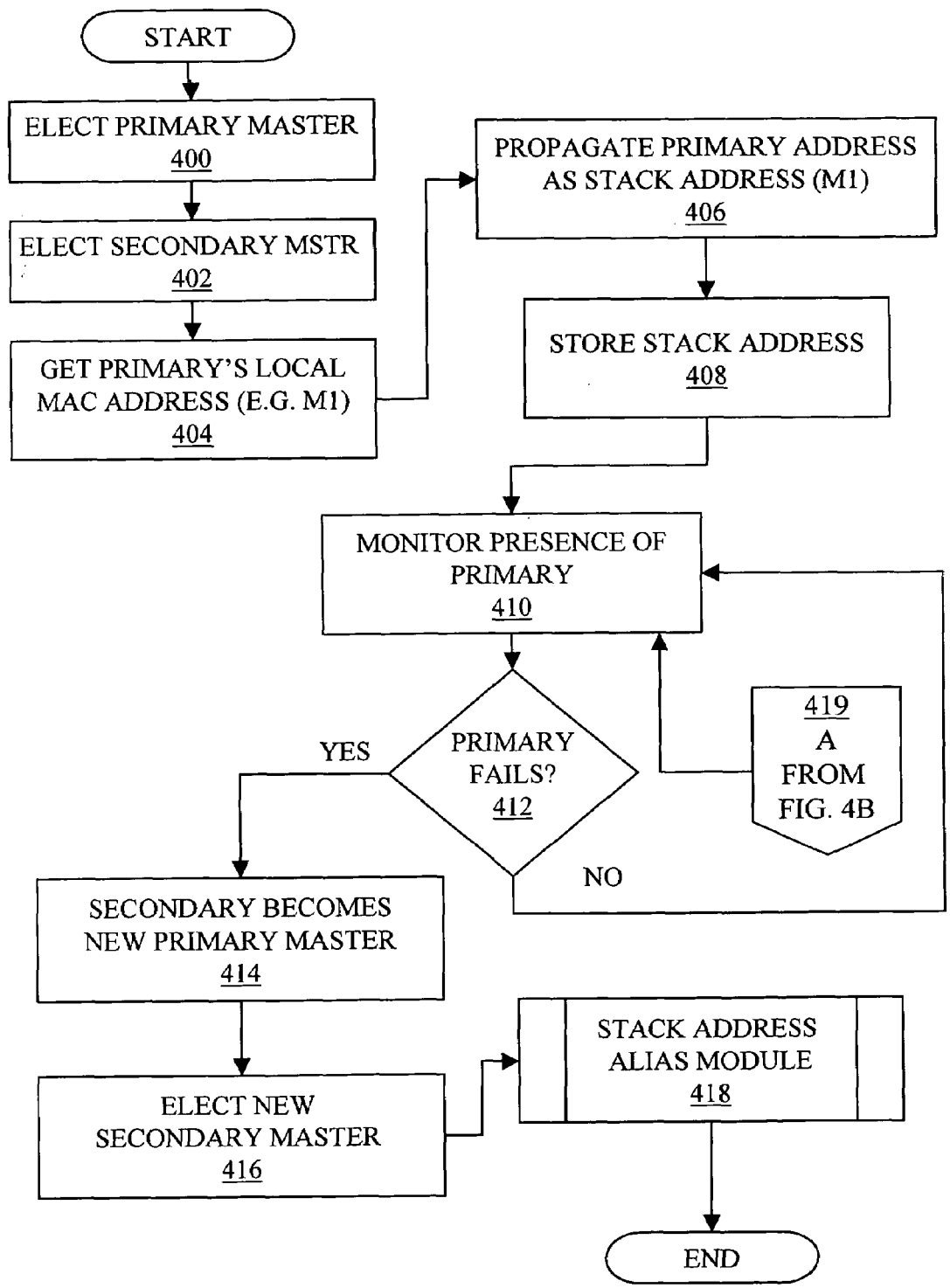
FIG. 4A is a flow chart showing the election of the primary and secondary master switches and when the secondary master functions as the new primary master, in accordance with the preferred embodiment of the present invention.

FIG. 4A is a high-level flowchart showing the election of the primary and secondary master switches and when the secondary master assumes the role of the primary master switch, according to an embodiment of the invention. In general, the stack manager assigns the stack address and retains such address indefinitely, unless there is a specified restart time as further discussed below.

After discovery 310 of the stack, for example, after boot-up, the stack manager 214 elects the primary master (step 400) and the secondary master (step 402). This election process may also be manually forced by the network manager, for example, via the management module 220. The stack manager 214 obtains the local MAC address 218 of the elected primary master and uses this as the stack address (step 404), which is then propagated to the other elements of the ISS system (step 406). This stack address is then stored (step 408), for example, in memory for later processing and comparison. For purposes of this illustration, this stack address is called M1. The presence or the primary master is continuously monitored (step 410) to determine if the secondary master has to take over the role of the primary master.

If the elected primary master fails (test 412), the secondary master automatically becomes the new primary master (step 414). The failure of the primary master, preferably automatically, triggers the secondary master to function as the new primary master. A new secondary master is then elected (step 416) in case the new primary master fails. A determination is then made whether to keep the current stack address or replace it with a new one. This is handled by the stack address alias module (step 418). The primary master is deemed to have failed if it generally encounters any condition that makes the primary master in a state wherein it cannot perform its primary master functions. The conditions that trigger a primary master switch to fail are known to those of ordinary skill in the art.

Figure 4B:
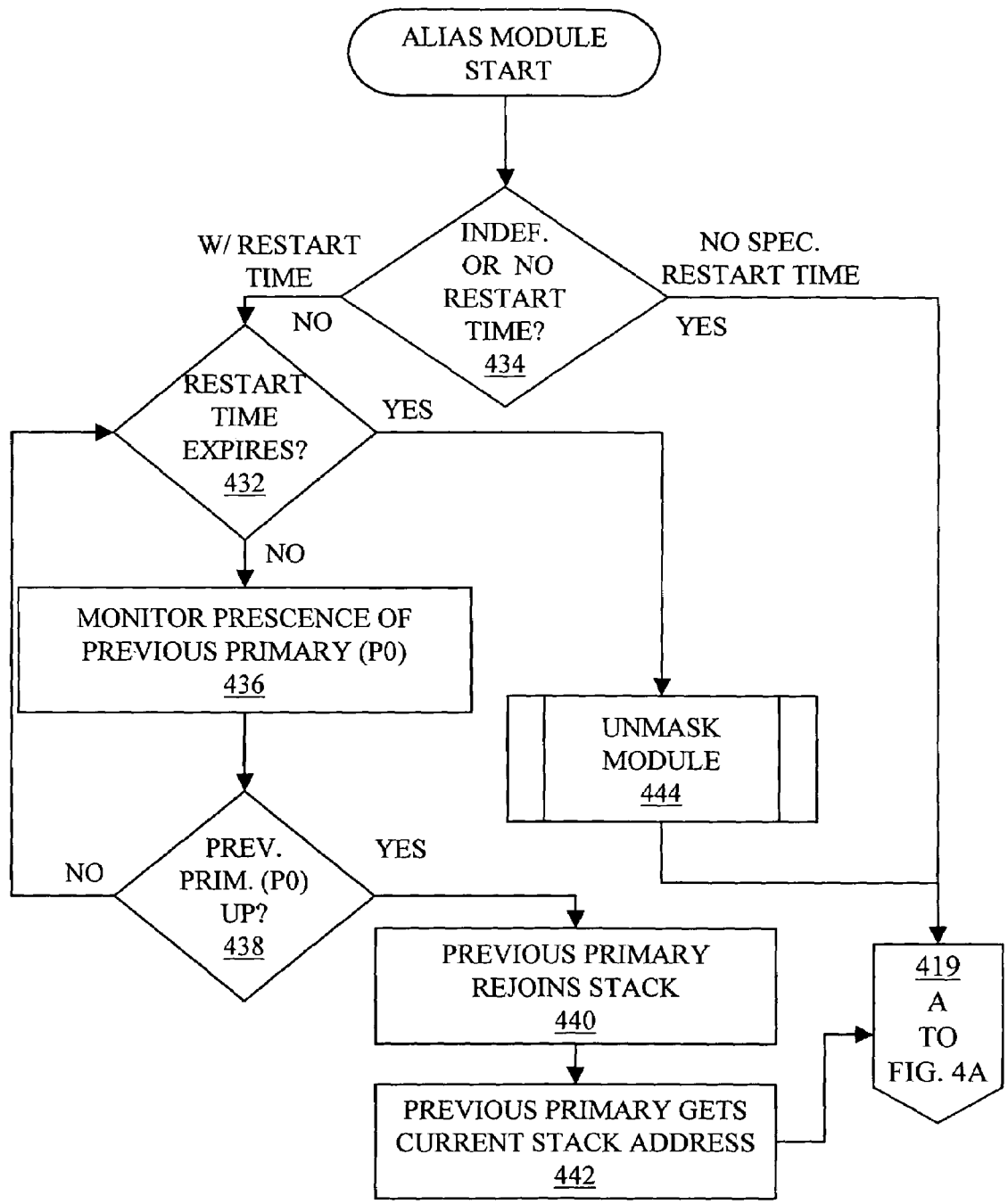
FIG. 4B is a flow chart showing high-level operations based on the restart time, in accordance with the preferred embodiment of the present invention.

FIG. 4B shows the stack address alias module 418 in more detail. In the first operation, the stack manager determines what type of restart time has been defined within the ISS system 120 (step 434). Preferably, there are two types of restart time—a definite restart time and an indefinite restart time. A definite restart time is any fixed period of time, including zero second, twenty seconds, fifty minutes, thirty-six hours, four weeks, etc. The restart time has been configured into the ISS system 120, preferably, via the configuration manager 222, for example, via an SNMP message. The restart time may be specified by the network administrator or by the stack manager 214, and may also be a system default value.

The definite restart time is the allotted fixed period of time enabling the previous primary to rejoin the ISS system, before the current stack address is replaced with a new stack address mirroring the address of the new primary master. This restart time when defined, for example, may take into account temporary failover conditions—without impacting outside devices. These temporary conditions, for example, may include the primary master being offline due to accidental dislodging of cables and temporary primary master maintenance. This restart time may be of any time period, including a few seconds, hours, minutes, days, weeks, and months. Mechanisms to define an indefinite restart time and a definite restart time, including the fixed period of time, is preferably included in a network management system interfacing with the device 200 of the present invention. In one embodiment, not specifying a fixed period of time means that an indefinite restart time has been specified for the ISS system 120.

An indefinite restart time generally indicates to the stack manager that the stack address should be maintained and not changed as long as possible. In one embodiment, this may be indicated by a Boolean flag. In the preferred embodiment, the stack address is only changed when there is a command received (not shown) by the stack manager forcing it to change the stack address to the new stack address based on the local MAC address of the currently functioning primary master or when a definite restart time has been defined into the system and the primary master that recently failed is unable to join the ISS 120 within the specified definite restart time. An indefinite restart time value may be implemented in various ways. In one exemplary embodiment, a network administrator is given an option to select indefinite or definite restart time using a Boolean flag. If a definite restart time is selected, the network administrator is further enabled to enter a fixed period to indicate the definite restart time. An indefinite restart time may also be indicated by the administrator by entering, for example, a null or blank value in an input field.

If a definite restart time has been specified (test 434), a check is done to determine if the definite restart time has expired (test 432). If the restart time has not expired, the presence of the previous primary master is monitored (step 436). In the preferred embodiment, the new primary master—the previous secondary master, preferably using the stack manager, probes the presence within the ISS of a switch element 200 having a local MAC address 218 the same value as the current stack address. This current stack address was previously stored (step 408). If an element is found having a local MAC address the same as the stack address, this means that the previous primary has now rejoined the ISS system (step 440). The previous primary then rejoins the stack as an element of the ISS system (step 440) and obtains the current stack address (step 442).

The currently operating primary master is continuously monitored to determine if it has failed. This is done regardless whether a restart time is specified or not. This enables the secondary master to assume the role of the primary master and alleviate disruption when the primary master fails. If the restart time, however, has expired (test 432), the stack manager 214 executes the unmask features (step 444) of the present invention.

Figure 4C:
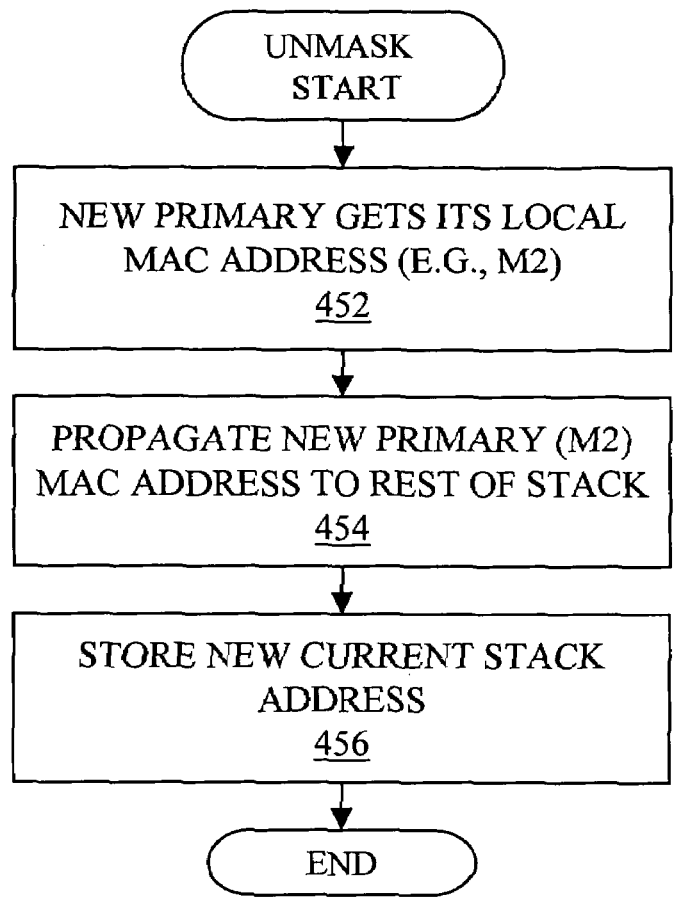
FIG. 4C is a flow chart showing the operations of replacing the old stack address with a new stack address, in accordance with an embodiment of the present invention.

FIG. 4C shows the unmask features in more detail. In the first operation, the currently operating or new primary master obtains its local MAC address 218, e.g., M2 (step 452). This address, M2, is now used as the current stack address and is propagated to the rest of the elements within the ISS (step 454). This current stack address is then stored as the new current stack address (step 456). Because there is a now a change in the stack address, remote devices coupled to the ISS, for example, via a network, now have to update their respective tables, including Layer 2 and Layer 3 tables, to record the new stack address of the ISS 120. The ISS 120, if using the spanning tree protocol, may also have to recompute a new spanning tree. Link aggregation protocols may also have to be recomputed.

If an indefinite restart time has been specified (step 434) or if the primary master rejoins the ISS within the specified restart time (diagram 419 pointing back to FIG. 4A), the stack manager generally keeps using the old stack address, regardless of which element in the ISS system is the primary master or the secondary master. The stack address is maintained and not replaced, unless forced, for example, by the network administrator, through a command instructing the stack manager to replace the stack address with a new stack address or when a definite restart time has been specified and the primary master has not rejoined the ISS within the definite restart time. In other words, the features of the present invention generally maintain the old stack address and have the primary master aliases itself as another address, regardless if the primary master's local MAC address is the same or different from the stack address. By keeping the stack address stable, meaning not changing it automatically when a primary master fails, the present embodiment of the invention minimizes unnecessary updates of tables and unnecessary computations, e.g., spanning tree, and updates, e.g., ARP table updates. This is particularly helpful when the network administrator knows that the ISS configuration, particularly the elements included in that stack are generally stable and do not change over an extended period of time. This masking as a different address continues until there is a forced or automatic unmasked module. The forced unmasked module may be received by the stack manager 214 via the configuration manager 222 (not shown).

In the preferred embodiment of the invention, the ISS 120 of the present invention is also able to manually force an unmask module. This means that the stack address and the local MAC address of the current primary master element is made the same. This is helpful in those occasions wherein the network administrator decides, for example, to remove the element whose local MAC address, e.g. is M1, from the ISS—whose current stack address is also M1, and installs that element in another part of the network. Forcing the stack address and the MAC address of the primary master element to be the same avoids duplicate MAC addresses and conflicts in the network.

Figure 5:
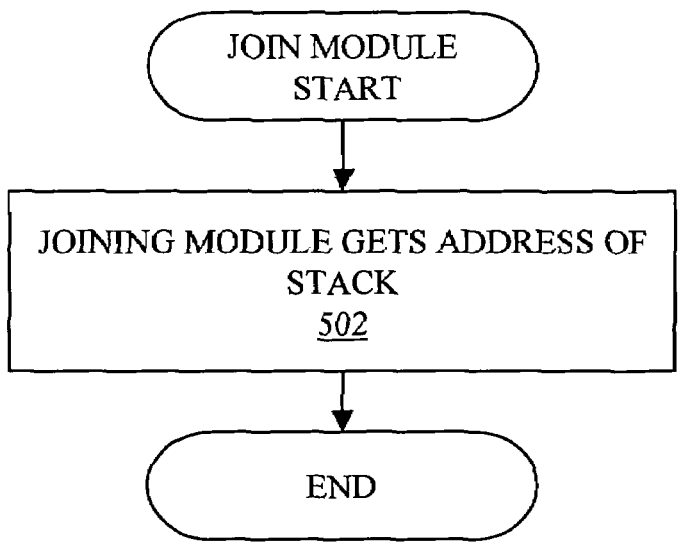
FIG. 5 is a flow chart showing that a joining switch element is assigned the current stack address, in accordance with an embodiment of the present invention.

FIG. 5 is a high-level flowchart showing the step in accordance with the preferred embodiment of the invention when a switch element joins or rejoins the ISS 120. In the first operation, the joining, which also includes rejoining, element obtains the current stack address (step 502). The joining element is then able to transmit packets as part of the ISS. The determination of whether the joining element is assigned the primary master, the secondary master, or the idle role is dependent on stack management implementation. As known to those of ordinary skill in the art, there are many mechanisms to determine which stack management role is to be assigned to each of the elements within an ISS system 120.

Figure 6A:
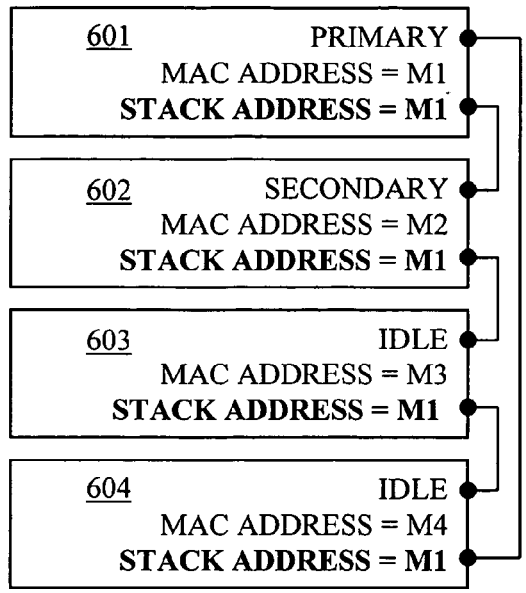
FIGS. 6A, 6B, and 6C illustrate an exemplary four-element ISS system, with a predefined definite restart time, before and after the failover to the second master, and after the joining of the previous primary into the ISS, in accordance with an embodiment of the present invention.
Figure 6B:
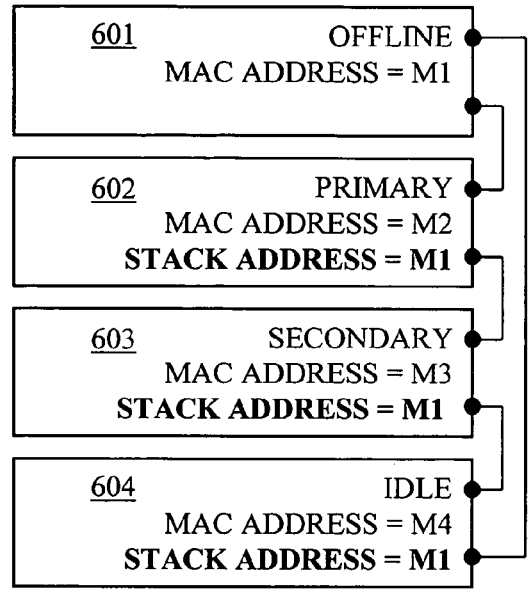
Figure 6C:
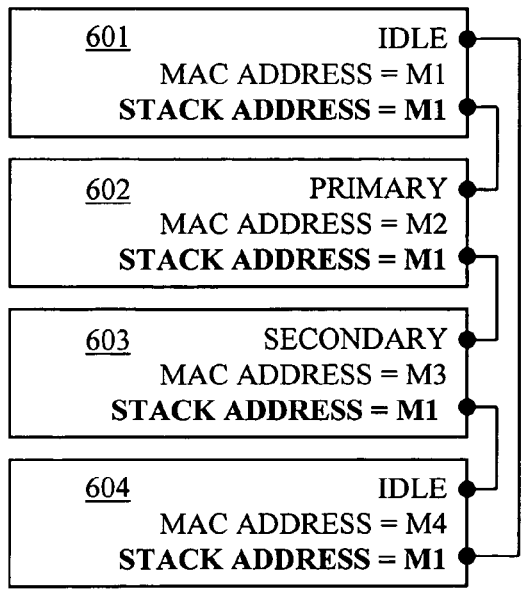

FIGS. 6A, 6B, and 6C illustrate an exemplary four-element ISS system 600 with a specified definite restart time, e.g., sixty seconds. FIGS. 6A and FIG. 6B show the ISS prior to the failover and after the failover, respectively. FIG. 6C shows the ISS after the previous primary joins the stack. In this example, the ISS has four switch elements 601, 602, 603, 604. Each element has its unique local MAC address assigned by the manufacture: the first element 601 with M1 local MAC address; the second element 602 with M2 local MAC address; the third element 603 with M3 local MAC address; and the fourth element with M4 local MAC address. During the initial election, generally during system boot-up, the stack manager 214 elects a primary master and a secondary master based on the election criteria implemented in the ISS. In this exemplary embodiment, the first element 601 was elected as the primary master, while the second element 602 was elected as the secondary master. The other elements 603, 604 are assigned idle management roles. The stack manager 214 fetches the local MAC address of the primary master 601, in this example, M1, uses that address as the stack address, propagates that stack address to the rest of the switch elements within the ISS 600, and stores that as the current stack address—M1. Each element in the ISS stores, preferably in memory, the same stack address.

Referring to FIG. 6B, during operation, the primary master 601, however, failed, e.g., became off-line. This failure and failover condition may be intentional or unintentional, and may include the administrator intentionally placing the primary master off-line, the cable to the primary master being dislodged, and the power supply to the primary master being turned off. Because the primary master failed 601, the secondary master 602 automatically functions as the new primary master. The stack address—M1, however, is not changed.

FIG. 6C shows the elements of the switch after the previously failing element 601 has joined the stack 600 within the specified restart time. Because the first element rejoins the ISS 600 within the specified restart time, sixty seconds, the stack address—M1—is not changed. The joining element 601 in this exemplary embodiment is assigned to the idle management role.

FIGS. 7A, 7B, 7C, and 7D illustrate an exemplary four-element system ISS with a specified restart time, e.g., sixty seconds. FIGS. 7A and 7B are similar to FIGS. 6A and 6B, respectively. FIG. 7A and FIG. 7B show the ISS 700 prior to the failover and after the failover, respectively. FIG. 7C, however, shows the ISS 700 after the specified restart time has expired and with the previous primary not joining the ISS 700 within the restart time of sixty seconds. In this figure, the stack manager 214 obtains the local MAC address of the primary master 702, in this case M2, and uses and propagates that address as the new stack address. In this case, even if the first element 701 is removed from the ISS 700, and installed in another part of the network, there would be no duplication of the MAC address. Assuming, however, that the first element is left in the ISS 700 and is powered on and joins the stack (FIG. 7D) after a certain period of time, twenty-four hours, for example, this element 701 joins the stack in an idle management capacity and obtains the stack address, M2, similar to the other elements. A stack element that functioned previously as a stack manager thus may also join the ISS 120 of the present invention, without any changes to the stack address.

Figure 8A:
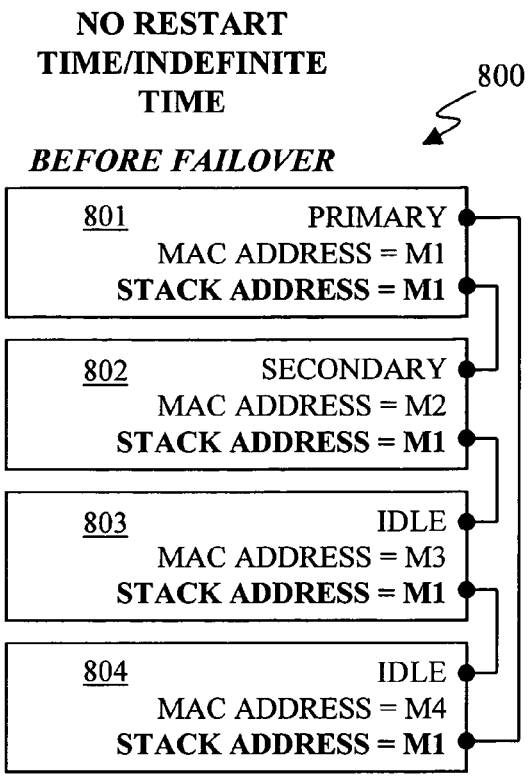
FIGS. 8A, 8B, 8C, and 8D illustrate an exemplary four-element ISS system, with an indefinite restart time—no restart time specified, before and after the failover to the second master, after joining of the previous primary into the ISS, and after another failure of the primary master, in accordance with an embodiment of the present invention.
Figure 8B:
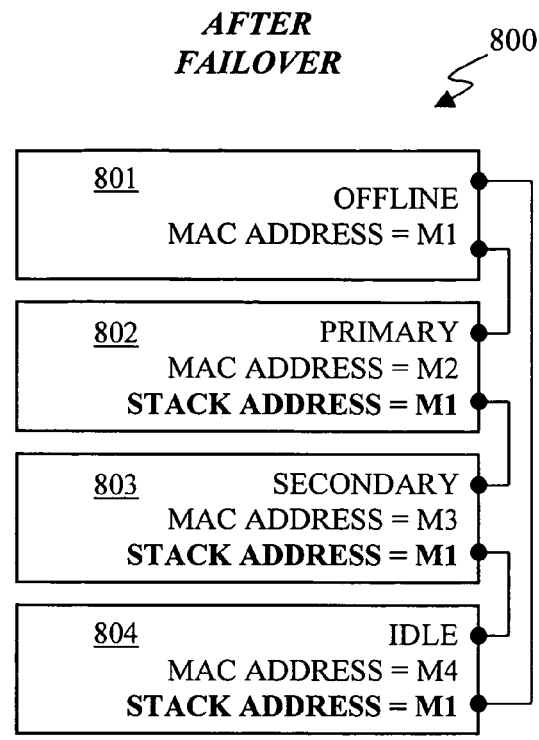

FIGS. 8A, 8B, 8C, 8C and 8D illustrate an exemplary ISS 800, but with an indefinite restart time. This means that the stack address is kept and not changed for an indefinite period of time. FIGS. 8A and FIG. 8B show the ISS 800 prior and after the failover, respectively. FIG. 8A is similar to FIGS. 6A and 7A, while FIG. 8B is similar to FIG. 6B and 7B. Considering that there is no specified restart time/indefinite restart time, the previous stack address is maintained and not changed, unless manually forced or there is a failover that warrants changing the stack address.

Figure 8C:
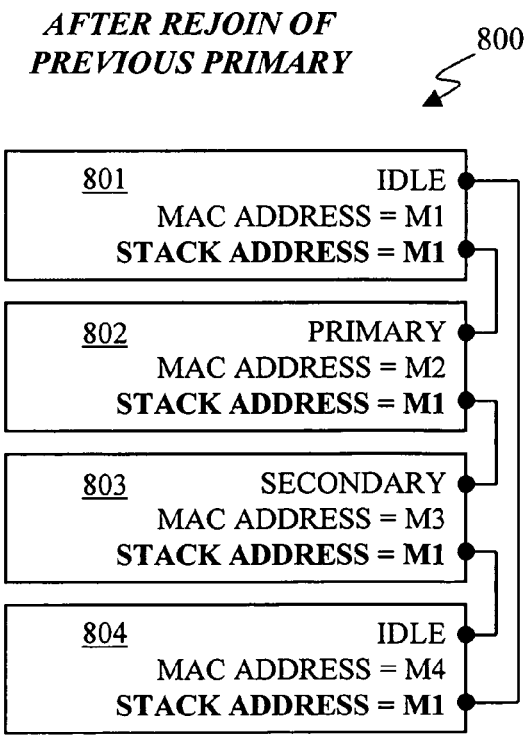

FIG. 8C shows the ISS 800 after the first element has joined the ISS 800. The first element is assigned to the role of an idle switch. This joining could have been done at any time after the failover. In this stage of operation, the ISS 800 still retains its stack address of M1.

Figure 8D:
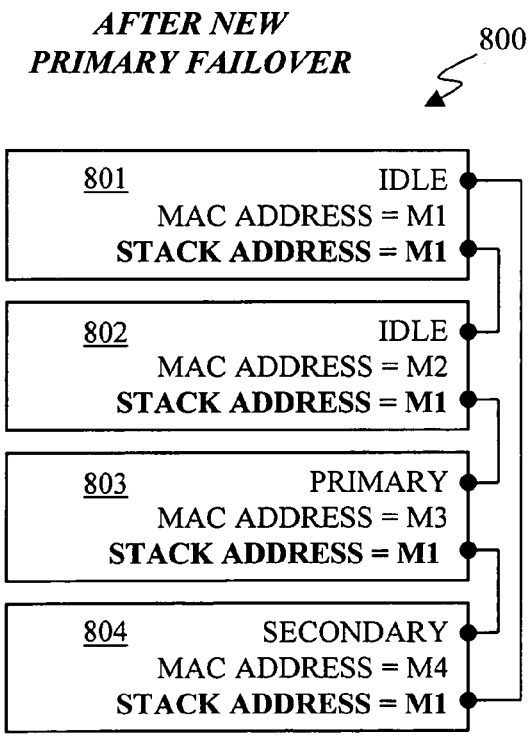

Assuming that during the continuous operation of this exemplary ISS, the new primary master now fails 802. FIG. 8D shows the secondary master 803 assuming the primary master role. The fourth element 804 is elected to become the new secondary master. The stack address, even with this second primary master failure, is left unchanged and is still the same stack address even after two failovers. Thus, even multiple failovers, which would have required a multiple number of updates and computations, are now handled without requiring unnecessary calculations or updates in the part of remote devices coupled to the ISS and even by the ISS itself. The ARP tables, for example, need not be updated during the multiple failovers, because the ISS 800 is still known with the same stack address M1. The failure of the primary element is thus to some extent masked from remote devices.

Figure 9A:
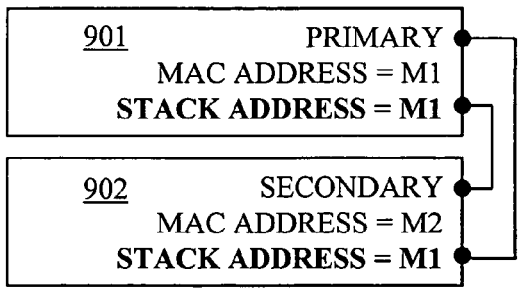
FIGS. 9A, 9B, and 9C illustrate an exemplary two-element ISS system, with a predefined restart time, before and after the failover to the second master, and after the joining of the previous primary into the ISS, in accordance with an embodiment of the present invention.
Figure 9B:
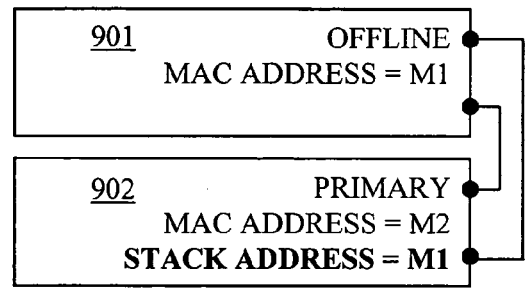
Figure 9C:
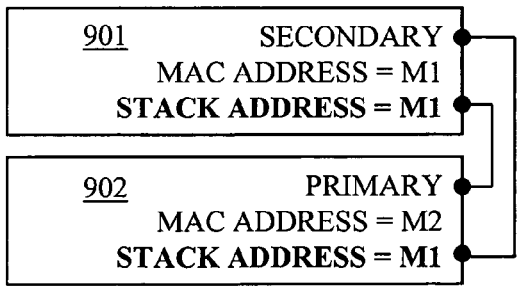

FIGS. 9A, 9B, and 9C illustrate an exemplary two-element ISS 900. In general, the joining element, in a two-element ISS, is preferably assigned the secondary master role. This is done so that the joining element can back-up the primary master. So unlike FIGS. 6A, 6B, 6C where the joining element is assigned the idle role, in this two-element ISS 900, it is assigned the secondary master role.

FIGS. 9A and 9B illustrate the two-element ISS 900 with a definite restart time—e.g., twenty minutes—before and after the failover, respectively. During the first election, the first element 901 is assigned to be the primary master and the second element 902 is assigned to be the secondary master. A failover, however, occurs as shown in FIG. 9B. The secondary master 902 thus becomes the primary master.

FIG. 9C shows that the first element joins the ISS again during the specified restart time of twenty minutes. In this case, the first element 901 becomes the secondary master and is assigned the stack address of also M1. The stack address, M1, is not changed.

Figure 10A:
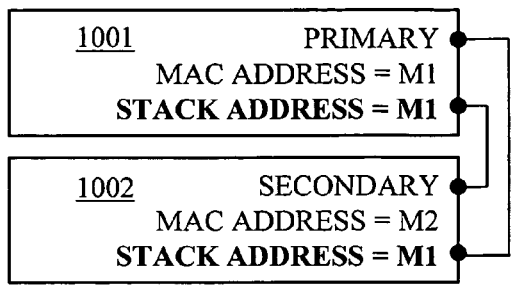
FIGS. 10, 10B, and 10C illustrate an exemplary two-element ISS system, with a predefined restart time, before and after the failover to the second master and after the expiration of the restart time, in accordance with an embodiment of the present invention.
Figure 10B:
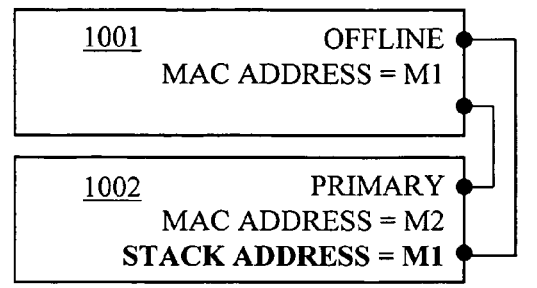
Figure 10C:
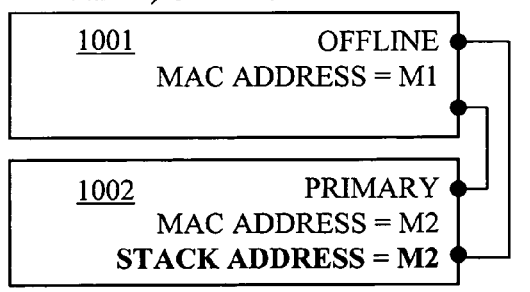

FIGS. 10A, 10B, and 10C illustrate the two-element ISS 1000 similar to FIGS. 9A and 9B. FIG. 10C, however, shows that the first element 1001 failed to join the ISS 1000 within the specified restart time of twenty minutes. In this case, the stack manager replaces the old stack address, M1, obtains the local MAC address of the primary master, in this case, M2, and then uses M2 as the new stack address.

Figure 11A:
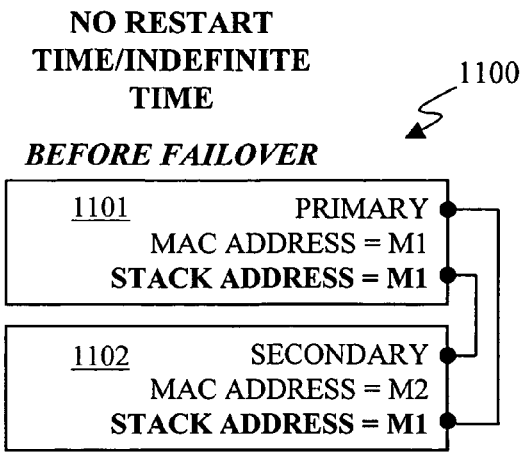
FIGS. 11A, 11B, 11C, and 11D illustrate an exemplary two-element ISS system, with an indefinite restart time—no restart time specified, before and after the failover to the second master, after joining of the previous primary into the ISS, and after another failure of the primary master, in accordance with an embodiment of the present invention.
Figure 11B:
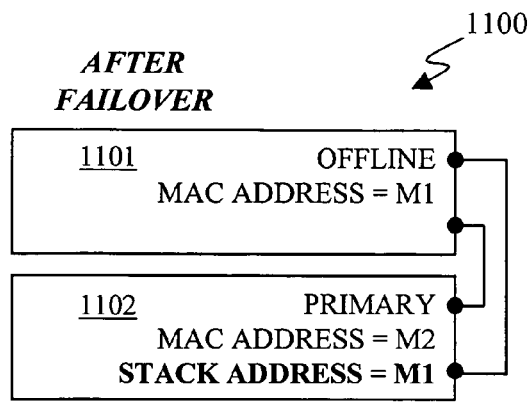
Figure 11C:
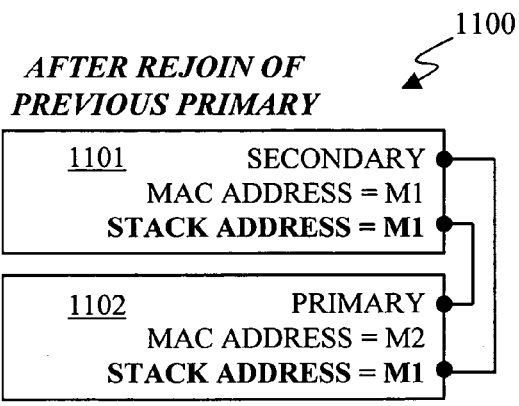
Figure 11D:
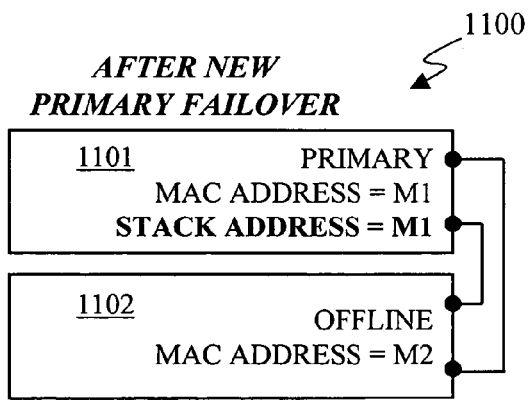

FIGS. 11A, 11B, 11C, and 11D illustrate another two-element ISS 1100 but with an indefinite restart time. FIG. 11A is similar to FIGS. 9A and 10A. FIG. 11B is similar to FIGS. 9B and 10B. FIG. 11C, however, shows that the first element 1101 eventually rejoins the ISS after the failover. In this case, the first element joins as a secondary master 1101 being assigned the same stack address of M1. The primary master 1102, however, fails later on. The secondary master 1101, in FIG. 1D, assumes the primary master role. The stack address of M1 is still the same, even after multiple failovers.

The present invention has been described above in terms of a presently preferred embodiment so that an understanding of the present invention can be conveyed. There are, however, many configurations for switches, forwarding devices, and stack managers not specifically described herein but with which the present invention is applicable. The present invention should therefore not be seen as limited to the particular embodiments described herein, but rather, it should be understood that the present invention has wide applicability with respect, for example, to switches, forwarding devices, and stack managers generally. For example, a stack manager implementing a new election mechanism, for example, having an ISS with more than two management roles, may still be used within the features of the present invention.

All modifications, variations, or equivalent arrangements and implementations that are within the scope of the attached claims should therefore be considered within the scope of the invention.

We claim:

1. A switching device for coupling in a stack switch system comprising a plurality of stack switches operably coupled, the switching device comprising:
 two stack ports, at least one of the stack ports operably coupled with one of the plurality of stack switches; and
 a stack manager operable to:
  elect a primary master switch to perform the primary stack management functions of the stack switch system;
  assign a stack address to the plurality of stack switches based on a local address of the primary master;
  monitor for the primary master by comparing a local address of each of the plurality of stack switches with the stack address;
  elect a secondary master switch ready to function as a new primary master switch when the primary master fails;
  receive a restart time wherein the restart time is a definite fixed period or an indefinite period;
  determine whether the stack address is to be replaced when the primary master fails and the secondary master switch functions as the new primary master switch;
  replace the stack address with a new stack address based on a local address of the secondary master functioning as the new primary master switch; and
  replace the stack address with the new stack address, when the primary master fails and the primary master is unable to join the stack switch system within the definite fixed period restart time.

2. The switching device of claim 1, wherein the stack manager is further operable to:
 receive a command to replace the stack address with a new stack address; and
 replace, based on the received command, the stack address with the new stack address based on the local address of the secondary master functioning as the new primary master switch.

3. The switching device of claim 1, wherein the stack manager is further operable to:
 assign the new stack address to the plurality of stack switches.

4. The switching device of claim 1, wherein the stack manager is further operable to:
 elect a new secondary master to replace the secondary master switch functioning as the new primary master switch.

5. The switching device of claim 1, wherein the stack manager is further operable to:
 enable the primary master to join the system of stack switches; and
 assign the new stack address to the primary master.

6. The switching device of claim 1, wherein the stack manager is further operable to: enable one of the plurality of stack switches to join the system of stack switches as an idle switch.

7. The switching device of claim 1, wherein the stack manager is further operable to:
 enable one of the plurality of stack switches to join the system of stack switches as a new secondary master.

8. A method of managing a system of stack switches comprising a plurality of stack switches, one of the plurality of stack switches elected as a first primary master switch, another one of the plurality of stack switches elected as a first secondary master switch, the system of stack switches assigned a stack address, the method comprising the steps of:

receiving a restart time indicating a definite restart time or an indefinite restart time;

replacing the first primary master switch with the first secondary master switch to function as the second primary master, when the first primary master switch fails;

electing a second secondary master from the plurality of switches when the first secondary master functions as the second primary master;

replacing the stack address with a new stack address based on the local address of the secondary primary master when the restart time is a definite fixed period and the first primary master is unable to join the system of stack switches within the restart time that is definite fixed period fixed, or replacing the stack address when a command is received to replace the stack address with a new stack address; and receiving the command to replace the stack address with a new stack address.

9. The method of claim 8, the method further comprising the step of:

assigning the new stack address to the plurality of stack switches.

10. The method of claim 8, the method further comprising the step of:

monitoring for the primary master by comparing a local address of each of the plurality of stack switches with the stack address.

11. The method of claim 10, the method further comprising the step of:

enabling the first primary master to join the system of stack switches as one of the plurality of stack switches and wherein the first primary master is assigned the stack address.

12. The method of claim 8, the method further comprising the step of:

enabling one of the plurality of stack switches to join the system of stack switches as an idle switch.

13. The method of claim 8, the method further comprising the step of:

enabling one of the plurality of stack switches to join the system of stack switches as a new secondary master.

14. A method of managing a system of stack switches comprising a plurality of stack switches, one of the plurality of stack switches elected as a first primary master switch, another one of the plurality of stack switches elected as a first secondary master switch, the system of stack switches assigned a stack address, the method comprising the steps of:

receiving a restart time indicating a definite restart time or an indefinite restart time;

replacing the first primary master switch with the first secondary master switch to function as the second primary master, when the first primary master switch fails;

replacing the stack address with a new stack address based on the local address of the secondary primary master when the restart time is a definite fixed period and the first primary master is unable to join the system of stack switches within the restart time that is definite fixed period fixed, or replacing the stack address when a command is received to replace the stack address with a new stack address; and monitoring for the primary master by comparing a local address of each of the plurality of stack switches with the stack address.

15. The method of claim 14, the method further comprising the step of:

receiving the command to replace the stack address with a new stack address.

* * * * *

UNITED STATES PATENT AND TRADEMARK OFFICE
CERTIFICATE OF CORRECTION

PATENT NO. : 7,630,299 B2 Page 1 of 1
APPLICATION NO. : 11/028346
DATED : December 8, 2009
INVENTOR(S) : Magret et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1325 days.

Signed and Sealed this

Twenty-first Day of December, 2010

David J. Kappos
*Director of the United States Patent and Trademark Office*